COMPARISON DEVICE

FORM ELEMENT COUNTER 3,430,198
Patented Feb. 25, 1969

3,430,198

METHOD OF AND APPARATUS FOR AUTOMATICALLY IDENTIFYING SYMBOLS APPEARING IN WRITTEN MATTER

Günther E. Gattner and Rolf F. Jurk, Munich, Germany, assignors to Siemens Aktiengesellschaft, Munich, Germany, a corporation of Germany Filed Nov. 4, 1960, Ser. No. 67,373
Claims priority, application Germany, Nov. 13, 1959, S 65,820
The portion of the term of the patent subsequent to May 7, 1983, has been disclaimed and dedicated to the Public
U.S. Cl. 340—146.3 24 Claims
Int. Cl. G06k 9/02

The invention disclosed herein is concerned with an arrangement for automatically identifying or recognizing characters or symbols appearing in written matter.

The operation of equipment used in the communication art and in message processing apparatus frequently requires automatic scanning of symbols, for example, characters or numerals, by means of light-electrical scanning devices, and to thereafter identify the scanned symbols for use in controlling, by means of suitable signals, the operation of communication apparatus or of message processing devices, for example, printing devices, typewriters or calculating machines.

Diverse methods have become known for identifying symbols, based upon comparing symbols respectively involved in a given case, with a number of predetermined symbols. The comparison may be optical-geometrical or, after conversion of the symbols, by a suitable light-electrical converter, into electrical signals, a comparison by means of electrical circuits. The comparison can be effected in the latter case directly after the light-electrical conversion or after an intermediate storage of the electrical signals. The comparison can in any case involve an entire symbol, which is brought into alignment with a predetermined comparison symbol, or may involve only predetermined characteristic features of a symbol. The characteristic properties of a symbol may for example be given elements of form which are inherent in the individual symbols.

The present invention is concerned with a circuit arrangement for automatically recognizing or identifying symbols by evaluating form elements which are characteristic of the individual symbols.

A method has already become known for automatically recognizing symbols (Technical Announcements of the Standard Elektric Lorenz AG (SEL), 1958, number 3, pages 127–143, and especially page 140 et seq.), employing a distribution of plane quantized voltage values which are produced time-parallel from plane-like form differences of a given numeral, by means of photoelectric converters, for deriving a potential field over coupling diodes in a resistor network which is grounded at its margin. In this potential field, predetermined form criteria are measured, resulting in turn in predetermined form elements which are characteristic of the respectively involved numeral. Such form criteria are, for example, the first and the second spatial differential quotient of the potential, the current flow-in and the field potential at a given point of observation. The tie-in points of the resistor network must be examined in accordance with these form criteria. The form criteria can be converted to numerals by means of a device which assigns or allots given form criteria to predetermined parts of a numeral.

The known method requires for each tie-in point of the resistor network which is to be examined, an expenditure corresponding to the multitude of the measurements to be effected. It must be considered in this connection that it is necessary to establish, respectively, whether the current flowing over a coupling diode into the network at the tie-in point under observation exceeds a predetermined limit value, further, whether the field potential obtaining at the observed tie-in point exceeds the feed-in potential and, moreover, to determine the sign (+, 0, −) of the first the second spatial differential quotient of the potential at the involved tie-in point in the $x$-direction as well as in the $y$-direction. It is also necessary to effect in the resistor network prior to the determination of the form criteria an accurate alignment or centering, respectively, of the numeral to be identified, so as to obtain the correct numeral or number from the ascertained form criteria.

The present invention shows another way for automatically advantageously identifying symbols from form elements which are characteristic thereof. In accordance with the invention, the appearance of diverging and/or converging of parts of a scanning line course, representing respectively a form element, is determined in columnwise or linewise scanning of a symbol, by comparison of mutually corresponding scanning signal elements of a column and/or a line and of a preceding column and/or line, signalling respectively the presence or absence of an element of the line course of the scanned symbol, and/or by comparison of pairs of mutually corresponding scanning signal elements of a column and/or line, and a preceding column and/or line, thereby obtaining the respective symbol by comparison with predetermined form element symbols. The comparison of the various mutually corresponding signal elements of two scanning lines or of the pairs of signal elements respectively formed thereby, can be effected simultaneously, that is, in parallel, or successively stepwise, that is, serially.

In accordance with an advantageous variant of the method according to the invention, there are produced, in columnwise or linewise scanning of a symbol, signal elements corresponding respectively to the appearance or nonappearance of an element of a scanning line course, and in the sequence of pairs of mutually corresponding signal elements of a column and of a preceding column, there is ascertained the appearance of a signal element pair which has only one signal element corresponding to a signal element of an element of a line course and lying between two signal element pairs which respectively consist of two signal elements corresponding to the appearance of an element of a line course, thereby recognizing the appearance of the divergence or convergence of parts of a line course representing a form element.

In accordance with another feature of the invention, the form elements which are recognized, responsive to the scanning of a symbol, are stored in a storer in accordance with their relative positions within the scanned symbol, the respective symbol being obtained by comparison of the stored elements with predetermined form element symbols.

While the known "potential method" requires that the number or numeral which is to be identified must be represented in the circuit arrangement by a potential field, as it were analogously, so as to enable recognition of the form elements, such analog representation is not required in the present invention, the latter providing for direct digital expressions concerning the form elements which are characteristic of the symbol which is to be recognized.

The advantage of the present invention resides in the fact that it can be realized by means of a simple circuit arrangement constructed of coincidence circuits and storage members which are effective to produce a linking between mutually corresponding scanning signal elements of a scanning column and a preceding scanning column and successive pairs of signal elements, respectively. The identification of a symbol is made largely independent of the individual representation thereof, that is, of its size, its inclination and distortions, as they appear especially in hand written symbols, since the symbol to be identified is scanned series-like column for column and since the signal elements which indicate the presence or absence of an element of a line course of a column and a preceding column are mutually compared step-by-step. Moreover, an accurate alignment or centering of the symbol to be identified is unnecessary; the position of the scanned symbol is indeed inconsequential provided that it is fully encompassed by the scanning.

In accordance with another feature of the invention, other form elements, especially such as are represented by a straight line course, may be utilized for the automatic identification of symbols, in addition to the diverging or converging representing form elements, so as to facilitate the identification of numerals and/or characters of more difficult written matter.

The various features and objects of the invention will be described with reference to the accompanying drawings, in connection with the automatic identification of numerals or numbers, since they are of greater practical importance than other symbols. The invention is however basically applicable in the identification of any symbols, including numerals, characters, punctuation marks, function symbols, etc. In the drawings, FIG. 1 shows that the Arabic numerals 1 . . . 0 can be subdivided into a series of line courses of which the numerals are composed:

FIG. 2 indicates the scanning of a symbol in the form of serially effective point or dot scanning;

Figure 8:
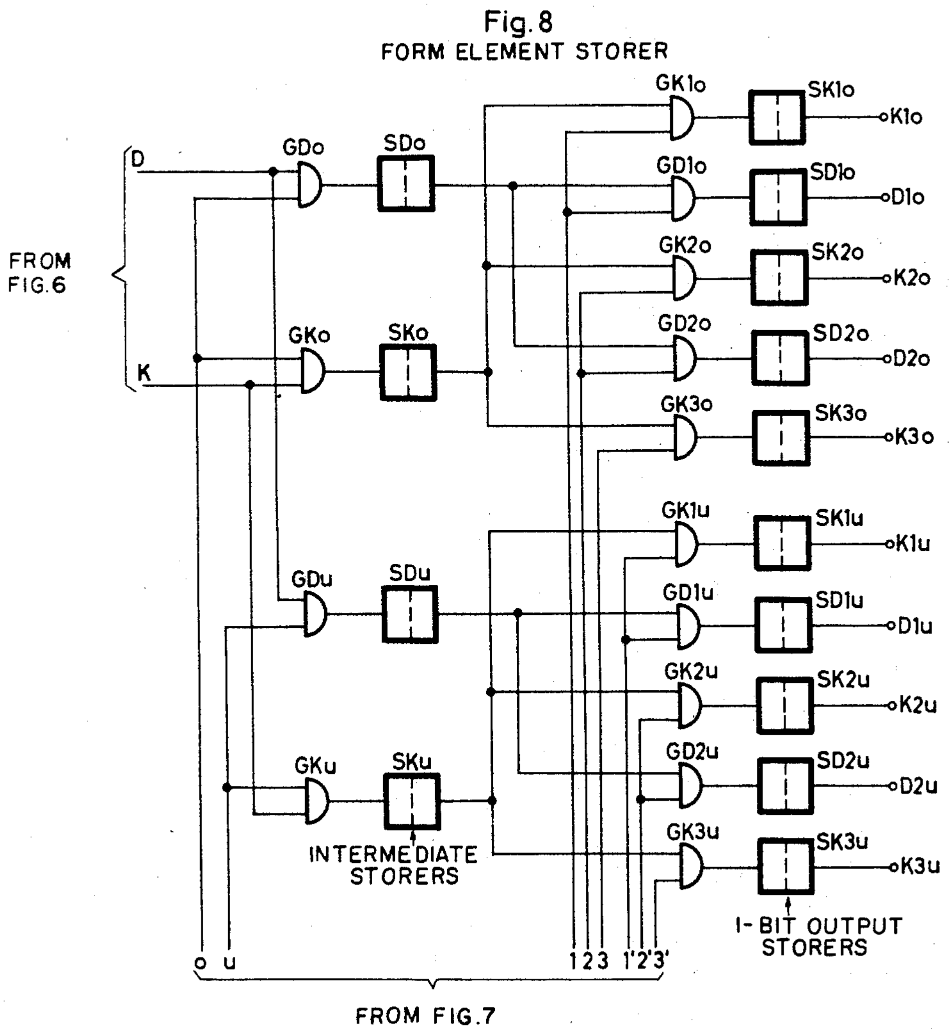
FIG. 8 is a form element storer.
Figure 9:
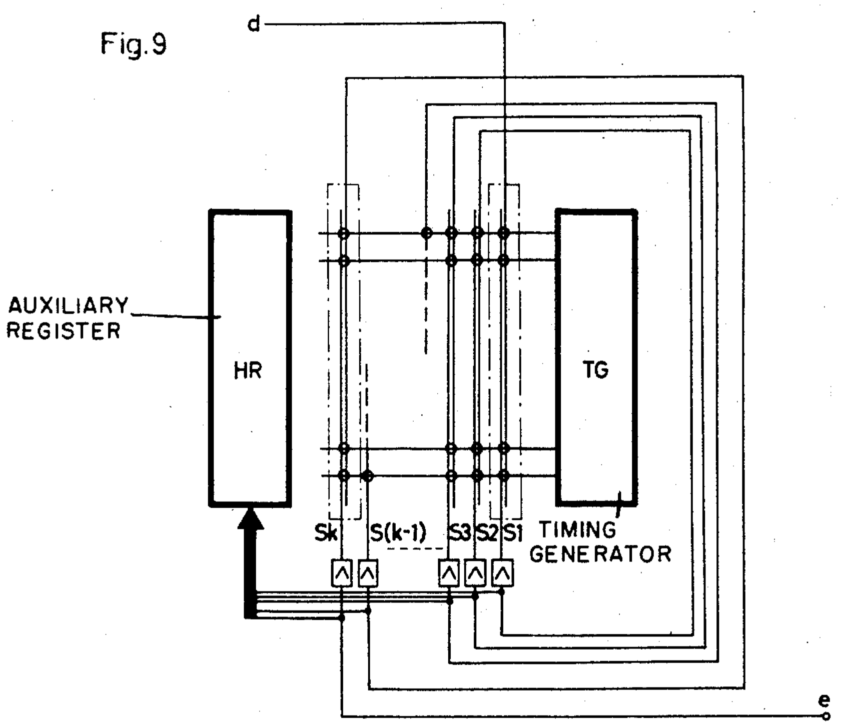
Figure 10:
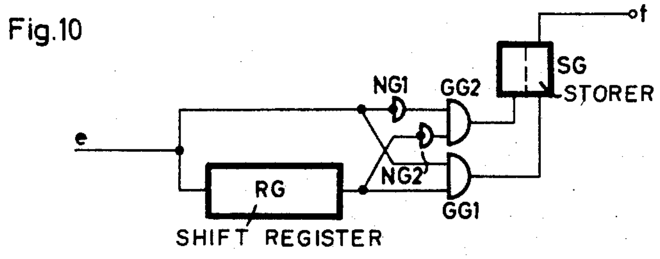
Figure 11:
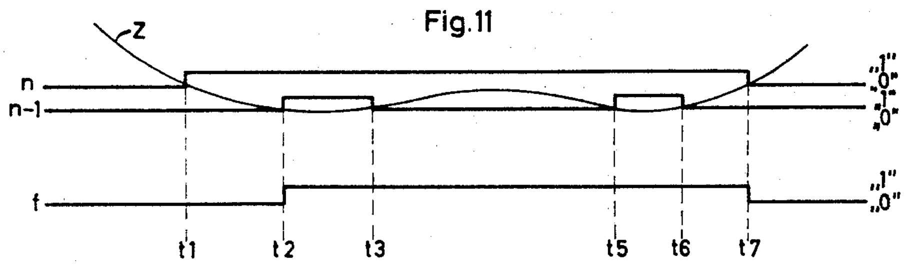
Figure 12:
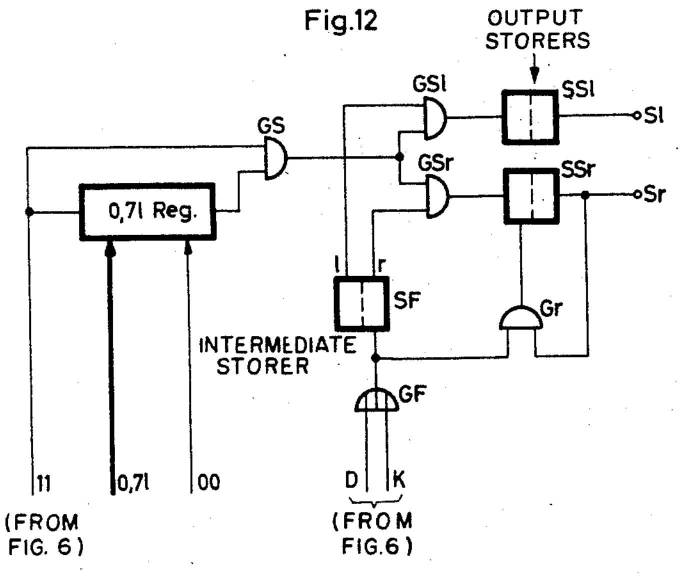
Figure 13:
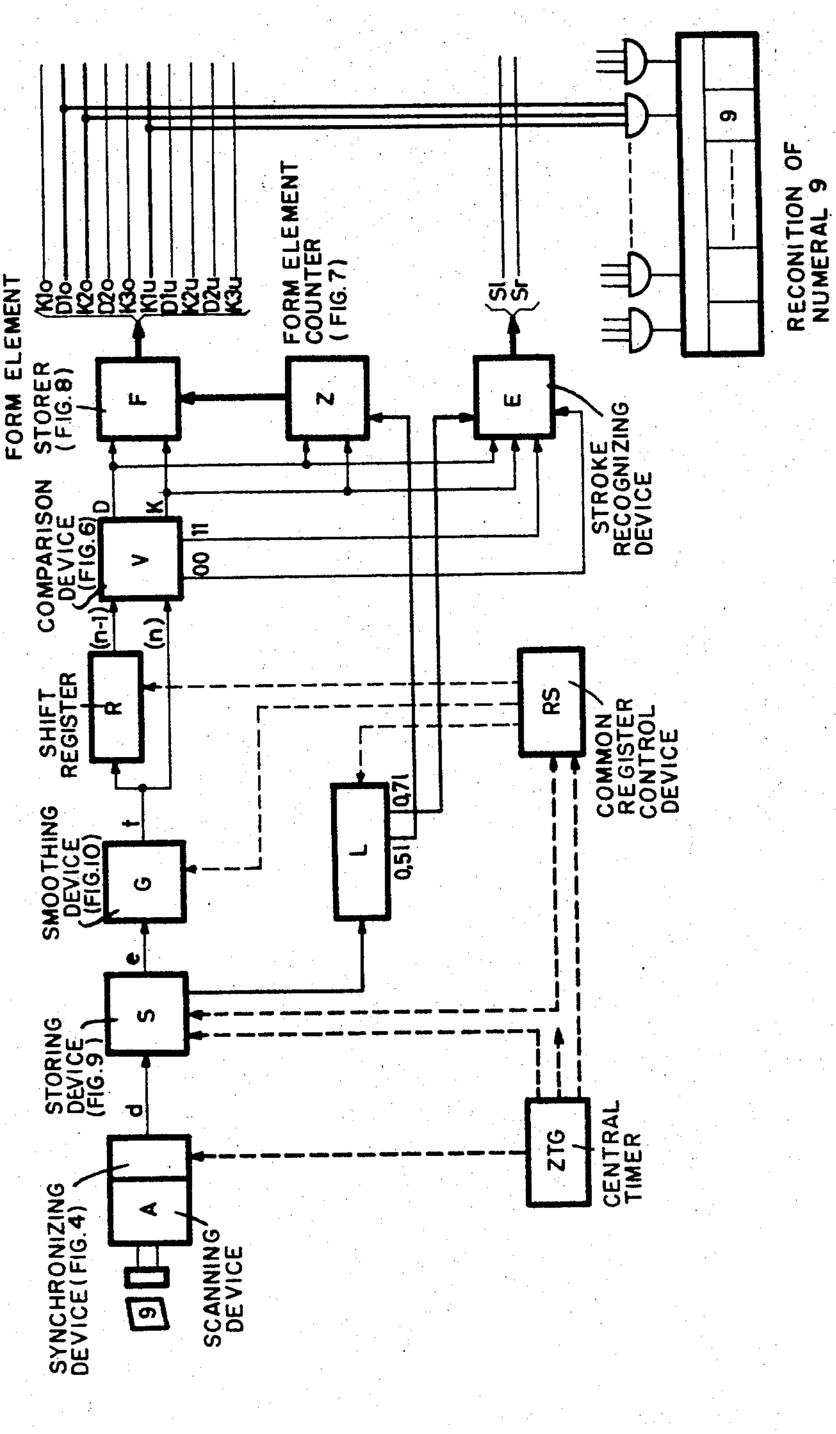

FIG. 9 indicates the principle of construction of a storing device;

FIG. 10 represents a device for smoothing the contours of a scanned symbol;

FIG. 11 illustrates the operation of the smoothing device of FIG. 10;

FIG. 12 shows a circuit arrangement for recognizing a straight line course utilized as a further form element; and FIG. 13 illustrates the use of gates in conjunction with the symbol form element storer shown in FIG. 8.

As noted before, FIG. 1 shows how the Arabic numerals 1–0 can be subdivided into a series of line courses of which the numerals are composed. These line courses are represented in the lines *b* to *i* below the respective numerals indicated in the top line *a*. Upon examining the individual line courses in the sense of an optical scanner, which scans the numerals in vertical columns (as indicated in FIG. 2), thereby encountering a line course or different parts of one and the same line course, it will be seen that the information content of each line course depends substantially on the manner in which the parts thereof extend mutually from one to the next scanning column, provided that such separate parts are present in a scanning column. This information content is according to the invention evaluated by going one step further with respect to simplification and merely ascertaining divergence and/or convergence of parts of a line course or complete absence thereof, respectively. In place of the different line courses represented in column *k* of FIG. 1, there will then appear simpler line courses such as illustrated in column *l*. These simpler line courses represent the form elements the appearance of which is to be investgiated in the scanned symbol by stepwise comparisons of mutually corresponding scanning signal elements of a scanned column and a preceding scanned column relating to one and the same symbol, the form element symbols as represented in the bottom line *m* of FIG. 1 being built up by such form elements.

It will be seen from FIG. 2 that the scanning of a symbol to be identified is according to the invention effected in the form of series point or dot scanning. Scanning devices suitable for this purpose are generally known in the communication art and details with respect thereto are therefore omitted. FIG. 2 shows the path of a scanning point or dot of such a scanning device. The scanning path proper is within each scanning column *l* . . . *i* indicated by full lines and the return path from one column to the next is respectively indicated by a broken line. The full scanning lines are shown more prominently wherever they extend over a line course or, better to say, over an element of a line course of the symbol which is to be identified.

Figure 2:
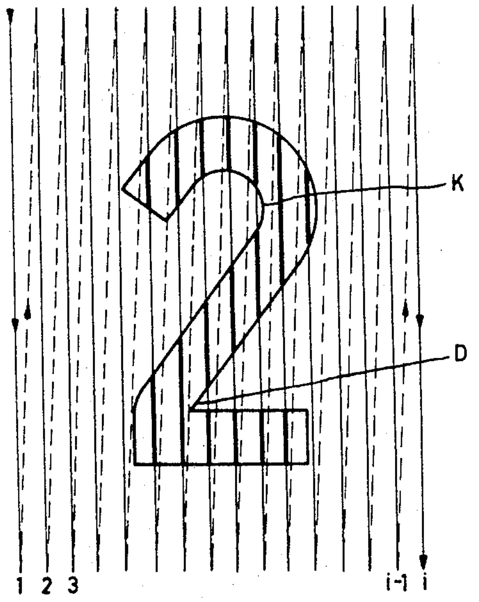
Figure 3:
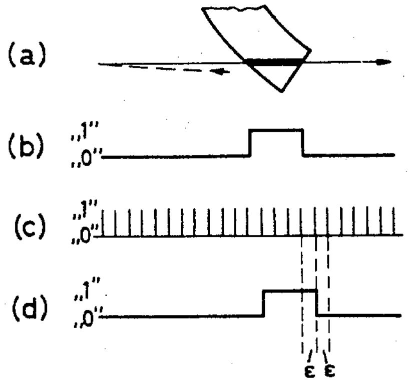
FIG. 3(*a*) represents a portion of FIG. 2 turned about by 90°; (*b*) illustrates a customary representation of a signal; (*c*) indicates timing impulses; (*d*) shows how the scanning signal (*b*) is subdivided into a finite number of scanning elements.

FIG. 3*a* shows a portion of FIG. 2 displaced by 90°. The scanning line is again shown in full line relatively faint representation so long as the scanning point does not encounter an element of the line course, while being shown more prominently for the extent thereof which passes an element of a line course of the scanned symbol. The respectively faint and more prominent full line therefore indicates (in FIG. 2) respectively the presence or absence of an element of a line course, thus in a sense representing images of the scanning signals produced incident to the scanning of the respective symbol. A more customary representation of such signals appears in FIG. 3*b*. Two signal conditions "1" and "0" are represented in FIG. 3*b*, namely, respectively the encountering or non-encountering of an element of a line course of the scanned symbol, depending upon the place in the scanning column according to FIG. 3*a* and thus also depending upon the time. When the scanning device scans an element of a line course of a symbol to be identified, it will produce a signal "1" and otherwise a signal "0." The changes in the conditions, that is, the transitions from the condition "0" to the condition "1" and vice versa are always effected accurately at instants at which the scanning dot or point passes over the borders of a line course within a scanning column.

In accordance with the invention, the scanning signals of a scanning column and those of a preceding scanning column are mutually compared. Owing to the finite size of the scanning dot or point, such a comparison cannot be continuous; it must be effected stepwise. The scanning signals of each scanning column are synchronized by a synchronizing device so as to properly carry out such comparison. A suitable circuit arrangement is shown in FIG. 4.

Figure 4:
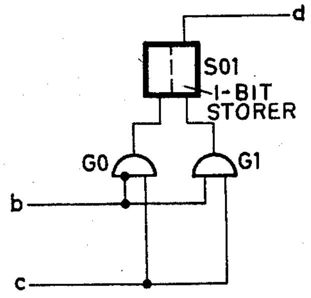
FIG. 4 is a circuit arrangement to be considered in connection with FIGS. 3(*a–d*)

The scanning signals, such for example as indicated in FIG. 3*b*, are conducted to an input terminal *b* of the circuit shown in FIG. 4. To the terminal *c* is connected a generator which produces timing pulses such as shown, for example, in FIG. 3*c*. To the input terminals *b* and *c* are connected two inputs of an And gate G1 and the inputs of a blocking gate G0, respectively, the blocking input of the latter gate being thereby connected with the terminal *b*. The outputs of the two gates are respectively connected each with an input of a suitable 1-bit storer S01; the synchronized signals are obtained at the output terminal *d* of the storer. The storer S01 can be triggered into the "1" condition only when such condition obtains at the output of the And gate G1, that is, when the coincidence requirement is fulfilled for such gate. This is only the case when a synchronizing impulse appears at the timing input terminal *c* while the condition "1" obtains at the signal input terminal *b*. The storer S01 can contrariwise be triggered into the "0" condition only when the condition "1" obtains at the output of the blocking gate G0, that is, when a synchronizing impulse appears at the timing input terminal *c*, while the condition "0" obtains at the signal input terminal *b* which is connected with the blocking input of the blocking gate G0. Accordingly, a change of condition from "0" to "1" or vice versa can be effected at the output terminal *d* only upon appearance of a synchronizing impulse. The scanning signal according to FIG. 3*b* is therefore subdivided into a finite number of scanning signal elements, as shown in FIG. 3*d*, which may respectively represent the signal condition "1" or "0," thereby signalling respectively the presence or absence of an element of a line course of the scanned symbol.

Figure 5:
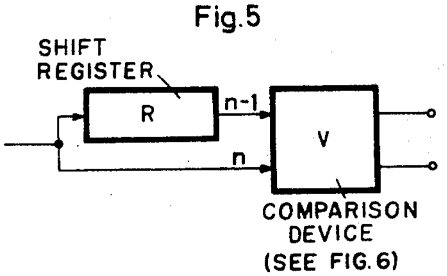
FIG. 5 shows the use of a shift register in cooperation with a comparison device.

In order to effect in the columnwise scanning of a symbol a stepwise comparison of mutually corresponding scanning signal elements of one scanning column and a preceding scanning column, it is necessary to simultaneously conduct the scanning signal elements of the two columns to a comparison device. The columnwise scanning requires a temporary storing of the scanning signal elements of the respectively preceding scanning column. As shown in FIG. 5, a shift register R can for this purpose be disposed ahead of the input of the comparing device V, such shift register R exhibiting a storage capacity which permits storage of the scanning signal elements contained in a scanning column. Such shift registers are well known, and details thereof are therefore omitted. The use of such a shift register makes it possible to conduct to one input *n* of the comparing device V (FIG. 5) the signal elements of a column which is being scanned while simultaneously conducting to the other input $n-1$ the corresponding signal elements of the preceding column, as is required in accordance with the invention.

Figure 6:
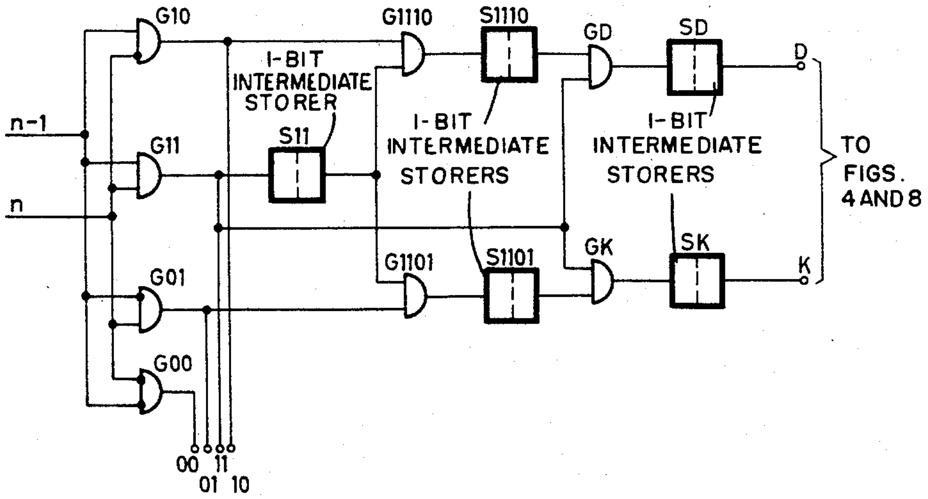
FIG. 6 represents the circuit of a comparison device.

FIG. 6 shows a comparison device for practicing the invention. As described before, the signal elements of a scanned column and corresponding signal elements of a preceding scanned column, produced incident to the scanning of a symbol which is to be identified, are simultaneously stepwise conducted to the two inputs *n* and $n-1$. To each input *n* and $n-1$ of the comparison device is connected one of the two inputs of four coincidence circuits, namely, the And gate G11, the two blocking gates G10 and G01, and the inverting And gate G00. The And gate G11 is connected over a 1-bit intermediate storer respectively with one input of two further And gates G1110 and G1101, the respective second input of which is connected with the output of the blocking gates G10 and G01, respectively. The And gates G1110 and G1101 are respectively extended over a 1-bit intermediate storer S1110 and S1101 respectively to inputs of two third And gates GD and GK, the other inputs of which are respectively connected with the output of the first And gate G11, and to the outputs of which are respectively connected 1-bit output storers SD and SK.

To explain more in detail the operation of the comparison circuit arrangement shown in FIG. 6, it shall be assumed that incident to the scanning of a symbol in a given scanning column, there is produced a sequence of signal elements "1," "1," "1," corresponding to the tracing by the scanning point or dot of a line course, and that the corresponding signal elements of the preceding scanned column have formed the sequence "1," "0," "1." Such sequences of signal elements can for example occur incident to the scanning or tracing of the symbol shown in FIG. 2 in the vicinity of the point K. Accordingly, after the scanning signal elements of the preceding scanning column have passed through a shift register according to FIG. 5, the comparison device shown in FIG. 6 will receive at its two inputs $n-1$ and *n* successively the pairs of signal elements "11," "01" and "11."

Upon receiving the first signal pair "11", both inputs of the respective four coincidence circuits G11, G10, G01 and G00 will be brought into the "1" condition. In case of the gate G11, there will occur coincidence, that is, the condition "1" will appear at its output. The storer S11 is thereby likewise triggered into the "1" condition which will accordingly also prevail at the inputs of the two second And gates G1110 and G1101 which are connected with such storer S11.

Upon receiving the next signal element pair "01," only the inputs of the four coincidence circuits G11 . . . G00, which are connected with the input *n* of the comparison device, will be placed into the "1" condition, while the inputs which are connected with the input $n-1$ will remain in the "0" condition. Coincidence will therefore occur in the case of the blocking gate G01, the blocking input of which is connected to the input $n-1$ of the comparison device. The output of this blocking gate G01 and therewith also one input of the And gate G1101, which is connected therewith, will assume the "1" condition. Since the other input of this And gate is already held in the "1" condition by the storer S11, coincidence will appear with respect to the And gate G1101, that is, the condition "1" will appear at its output. This in turn causes a switching over of the succeeding storer S1101 into the "1" condition. The "1" condition thus obtains also at the one input of the And gate GK which is connected with the storer S1101.

Upon receiving the third signal element pair "11," the output of the And gate G11 will be placed into the "1" condition as already described. A switching over of the succeeding storer is thereby not effected since such storer is already in the "1" condition as a consequence of the first signal element pair "11." However, to the output of the And gate G11 are connected the inputs of the two And gates GD and GK, at which the "1" condition appears likewise. Since the "1" condition obtains already at the other input of the And gate GK, which is connected to the storer S1101, coincidence will appear with respect to the And gate GK. The result is that the "1" condition will be extended to the output storer SK which is connected in series with the And gate GK. The activation of this output storer SK indicates appearance of a convergence of parts of the line course.

The indication of the divergence of parts of a line course of a scanned symbol is obtained in analogous manner by the activation of the output storer SD, for example, responsive to production, in one scanning column, of a signal element sequence "1," "0," "1" and production in the preceding scanning column, of a sequence of signal elements "1," "1," "1," the comparison device receiving in such a case successively the signal element pairs "11," "10" and "11." Such sequence of signal elements can occur, for example, in scanning of the symbol shown in FIG. 2 in the vicinity of the point D.

The 1-bit storers included in the comparison device shown in FIG. 6 are restored to normal immediately after the presence of a convergence or divergence of parts of a line course of the scanned symbol, representing a form element, and appearing at the outputs K or D in the form of the "1" condition, which is in suitable manner passed on for further evaluation. This restoration of the storers to normal is not illustrated in the figure since it is unimportant for the understanding of the invention.

The evaluation of the symbol form elements, as recognized by the comparison device shown in FIG. 6, can be effected by means of a form element storer which is controlled by the comparison device with respect to the form elements (divergence, convergence) by a form element counter with respect to the sequence of appearance, such counter being likewise controlled by the comparison device. In accordance with a further feature of the invention, the form element counter can also be utilized for determining the relative position of each scanning signal element and therewith also of the form elements within the scanning columns. A form element counter suitable for this purpose is shown in FIG. 7.

Figure 7:
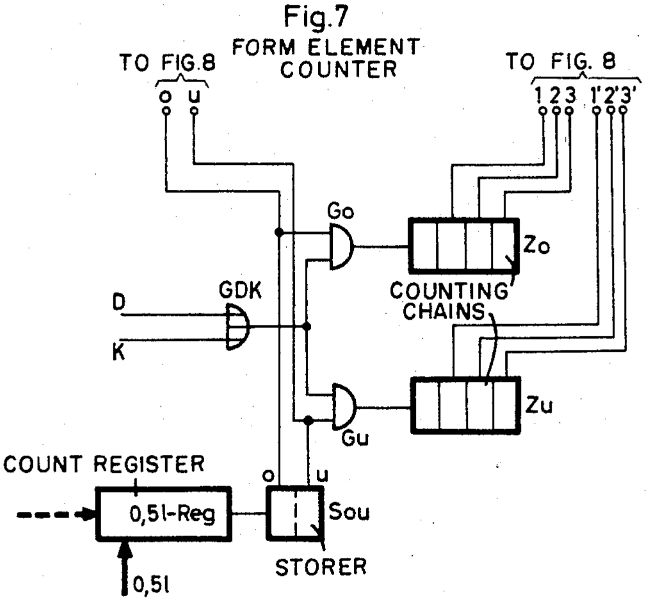
FIG. 7 illustrates a counter for symbol form elements.

The form element counter represented in FIG. 7 comprises two counting chains *Zo* and *Zu*, each preceded by and And gate as shown respectively at G*o* and G*u*. One input of each And gate is connected with the output of a mixing gate GDK which is in turn connected to the output terminals D and K of the comparison device illustrated in FIG. 6. The other input of each And gate G*o* and G*u* is respectively connected with an output such as *o* or *u* of a storer S*ou*. One of the And gates G*o* or G*u* is prepared at one of its inputs for coincidence, depending upon whether this storer is in one operating condition "above" or in another operating condition "below." This coincidence arises always when one of the outputs D and K of the comparison device is activated, that is, when a form element is recognized incident to the scanning of a symbol. One of the two counting chains Z*o* or Z*u* is always stepped ahead by one counting step, upon occurrence of coincidence, the respectively activated output 1, 2 or 3 or 1′, 2′, 3′ giving thereby information with respect to the individual counting stages as to the numerical position of the form element which is momentarily involved. Which of the two counting chains is to be stepped ahead will depend upon the prevailing operating condition of the storer S*ou*.

The storer S*ou* is controlled by a count register, the 0.5·1-register. This register is connected with a further register, not shown in FIG. 7, the length register L (see FIG. 13), such that the counting stage of the length register corresponding to the number 1 of the counting steps, which is last activated by a counting operation, marks the counting stage of the 0.5·1-register which corresponds to half of the number 0.5·1 of the counting steps. The length register is in suitable manner, which is of no particular interest at this point, controlled by the scanned symbol which is stored in a storer to be presently described, in such a manner, that the counting operation is, in the linewise scanning of the stored symbol, triggered by a vacant line which forms the upper border of the scanned symbol and does not contain an element of the line course, and terminated by the vacant line forming the lower border of the scanned symbol. After the number of the scanning signal elements lying between the vacant lines which form the upper and lower borders of the scanned symbol, has in this manner been counted, thereby furnishing a criterion for the height of the scanned symbol, there is released an operating cycle of the 0.5·1-register of the form element counter simultaneously with each comparison of the signal elements of two scanning columns by the comparison device, by the vacant line forming the upper border of the scanned symbol, which does not contain a line course, and the 0.5·1-register is, beginning at the marker counting stage, rearwardly operated to the first counting stage. To this first counting stage is connected the output storer S*ou*, its operation being such that it remains in its operating position "above" so long as the first counting stage of the 0.5·1-register is not activated. However, when the first counting stage of the 0.5·1-register is reached in the counting operation, which is carried out parallel to the comparison of the signal elements of two scanning columns, effected by the comparison device, the storer S*ou* will be switched over to the other operating condition "below," whereby its output 0 is placed from the "1" condition into the "0" condition while its other output *u* is switched from the "0" condition to the "1" condition. The counting chain Z*o* or the counting chain Z*u* of the form element counter is in this manner stepped along depending upon the positions of recognized form elements. Accordingly, the output 1, 2 or 3 of the form element counter which is activated, that is, which exhibits the "1" condition, indicates the order number of the form element which has been recognized in the upper half of a scanned symbol, while the outputs 1′, 2′, 3′ indicate analogously the order number of form elements lying respectively in the lower half of a scanned symbol. Attention may at this point be called to the fact that another and especially a finer subdivision of the scanned symbols can be employed in place of the described subdivision thereof in two halves.

FIG. 8 shows a form element storer which is with respect to the kind of recognized form elements controlled by the comparison device, while being with respect to the relative position thereof within the scanned symbol, controlled by the form element counter shown in FIG. 7. The form element storer comprises four And gates GD*o*, GK*o*, GD*u* and GK*u* which are respectively extended to the intermediate storers SD*o*, SK*o*, SD*u*, SK*u*. One input of each of the gates GD*o* and GD*u* is connected to the output D of the comparison device shown in FIG. 6, and one input of the gates GK*o* and GK*u* is connected to the output K thereof. The other input of the respective gates GD*o* and GK*o* is connected to the output *o* of the form element counter shown in FIG. 7, while the other input of the gates GD*u* and GK*u* is connected with the output *u* thereof. When a form element is recognized, one of the outputs D or K of the comparison device will be activated, depending upon the kind of form element, and one of the outputs *o* or *u* of the form element counter will exhibit the "1" condition, depending on the position of the form element in the upper or lower half of the scanned symbol. Accordingly, upon recognition of a form element, the coincidence condition will obtain in one of the And gates GD*o* . . . GK*u*, and the storer of the intermediate storing device SD*o* . . . SK*u* respectively associated therewith, which is allotted to the particular kind (for example, divergence) and position (for example, in the upper half of the symbol) of the form element, will be activated. The output of each intermediate storer SD*o*, SK*o*, SD*u*, SK*u* is connected with one predetermined input of further And gates GD10, GD20; GK10, . . . GK1*u*, GK3*u*. The other predetermined inputs of these And gates GD10, GK10; GD20, . . . GK3*u*, are respectively connected with outputs 1, 2 . . . 3′ of the form element counter. Each And gate GK 10 . . . GK3*u* is respectively connected with a 1-bit output storer SK10 . . . SK3*u*, to which is respectively assigned a particular kind of form element as to the relative position and numerical order assumed thereby upon appearance thereof. Upon recognition of a form element and depending upon the kind thereof (for example, divergence), its relative position (for example, in the upper half of the scanned symbol) and order number of appearance (for example, in the second place), coincidence will occur in a particular And gate, for example, the And gate GD20. This will activate the output storer respectively associated with this particular And gate, in the assumed case the storer SD20, that is, the "1" condition will appear at the output D20 thereof. The form element in question is therewith established as to its kind, relative position and its order number of appearance.

Figure 1:
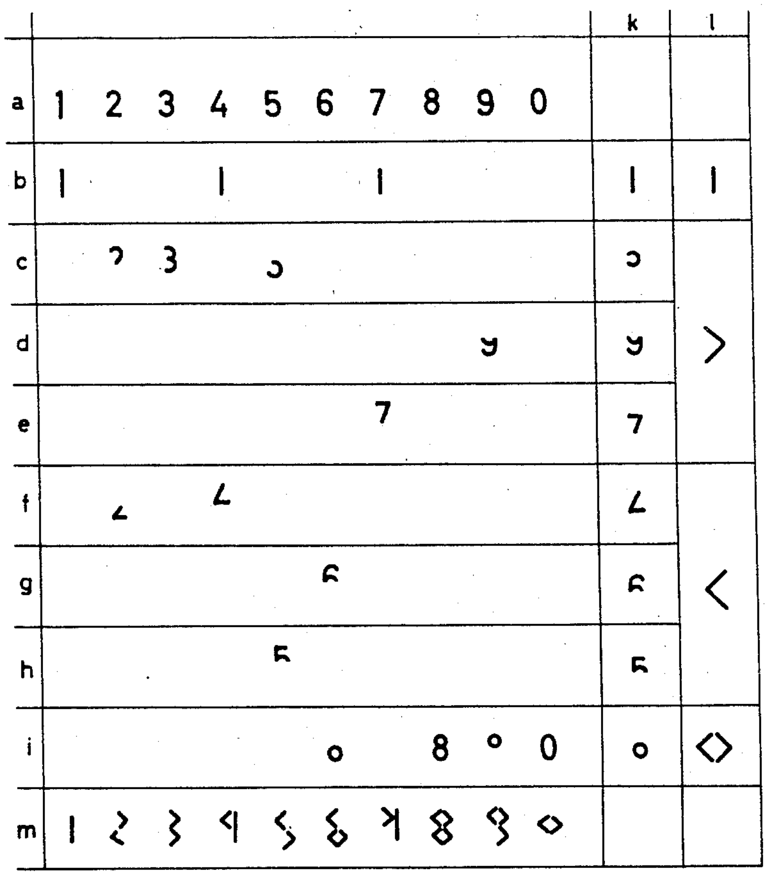

After all form elements of a scanned symbol are in this manner established, the corresponding symbol will result from a comparison with predetermined form element symbols, that is, predetermined symbols, which are composed of form elements as shown in the bottom line *m* of FIG. 1. Such a comparison can be effected by means of a circuit which implicitly receives the predetermined form element symbols. For this purpose, a number of And gates, each respectively assigned to a predetermined symbol, can be connected to the respective outputs K10 . . . K3*u* of the form element storer shown in FIG. 8, the arrangement being thereby such that upon activation of those outputs of the form element storer, which are assigned to the form elements of a predetermined form element symbol, coincidence will appear in the And gate allotted to such symbol, whereby the corresponding symbol is identified.

FIG. 13 shows an arrangement including such And gates connected to outputs such as K10 . . . K3*u* of the form element storer, the connecting lines for the identification of the numeral 9 being particularly emphasized to give an example.

It is for the above described determination of the relative position of the form elements necessary to provide in some manner for a survey of the symbol to be identified, throughout its entire extent, so as to establish appearance of a form element, for example, in the upper or the lower half of the scanned symbol. Such a survey is obtained either by multiple scanning of the involved symbol or by temporary storage thereof. As already described, a storage device may be used for controlling the operation of a length register L (FIG. 13) which counts the scanning signal elements lying between the blank or vacant lines which delimit the upper and lower borders of the respectively scanned symbol, and such length register marking a given stage of the 0.51-register of the form element counter, in accordance with the counting results.

The structure, in principle, of a storage device which is suitable for this purpose, is apparent from FIG. 9. This storage device, which precedes the comparison device, comprises a plurality of storage means S1 . . . S*k* corresponding in number to the number of scanning columns required for the scanning of a symbol. The storage means S1 . . . S*k*, which permits, in the manner of a shift register, release of successively stored signal elements in the time sequence of the storing thereof, have respectively a storage capacity which allows simultaneous storage of the signal elements contained in a scanning column. A common timing generator TG provides for parallel control of the storage means S1 . . . S*k*. Such storage devices and timing generator are already known and description thereof is therefore omitted.

As will be seen from FIG. 9, the individual storage devices S1 . . . S*k* are serially disposed, the output of a storage device being connected with the input of the next successive device by means of a bypass amplifier. The input *d* of the first storage device S1 is connected with the scanning device A (FIG. 13); to the output *e* of the last storage device S*k* can be connected the comparison device V or the shift register R, respectively, which is disposed ahead thereof.

The signal elements produced by the scanning device incident to the scanning of a symbol are serially conducted to the input *d* of the storage device shown in FIG. 9. After passing through the storage device, they are likewise serially released at the output *e* thereof. While passing through the storage device, the signal elements of each scanning column are extended from one to the next successive storage means in such a manner that each signal elements is extended from a given storage member of one storage means to the storage member of the next successive storage device which is connected with the same output of the timing generator TG. A signal extended serially from the scanning device is thus horizontally passed through the storage arrangement shown in FIG. 9 and finally again serially released at the output *e*. However, the signal elements contained in the individual storage members of the storage arrangement S1 . . . S*k*, which are connected with one and the same output of the timing generator TG, can be simultaneously taken off at the bypass amplifiers which are connected to the outputs of the individual storage arrangements S1 . . . S*k*. This means, that it is possible to effect in addition to the serial release of the signal elements contained in the scanning columns also a parallel release of the signal elements lying in the lines extending perpendicular to the scanning columns. It is thereby possible, by the use of an auxiliary register HR, indicated in FIG. 9, which is connected with the bypass amplifiers of the storage arrangement S1 . . . S*k*, to distinguish lines containing at least one signal element corresponding to the appearance of an element on a line course, from blank or vacant lines containing no signal element corresponding to the appearance of an element on a line course, thereby determining and establishing the upper and lower borders of a scanned symbol. The control of the length register in the previously described determination of the height of the respectively scanned symbols is thus made possible by the counting of the lines, lying between the vacant lines, which respectively contain at least one scanning signal element corresponding to the appearance of an element on a line course. Moreover, information concerning the upper and the lower borders of the stored symbol, required for the control of the various registers, can be given to a common reigster control device RS (FIG. 13) which is provided for controlling the various registers. It may also be particularly noted that, upon evaluation of a stored symbol in two coordinates, the evaluation in one coordinate direction can always be influenced in the other coordinate direction.

The scanning signal elements which are serially released by the storage device can be extended respectively directly to the comparison device V or the register R disposed ahead thereof. However, it may be in many cases advantageous to first eliminate interference signals such as are caused by irregularities and lack of sharpness of the symbols to be identified. It is thereby of advantage to avoid elimination of such interference signals by a length-(time-) separation in the comparison device, because such elimination would introduce an absolute value which would have to change according to the type of written matter and size of the respective symbols which are to be identified. In accordance with another feature of the invention, there is instead effected a comparison between two or more scanning columns, in such a manner, that only changes with respect to the scanning signal condition are taken into consideration for the symbol identification, which extend over two or more successive scanning columns. This effects as it were a smoothing out of the contours of the scanned symbols.

A suitable circuit arrangement for effecting such smoothing out is shown in FIG. 10. This arrangement comprises two And gates GG1 and GG2 which are respectively connected, each with an input of a storer SG, negators NG1 and NG2 being respectively disposed ahead of each input of the gate GG2. The scanning signal elements are connected directly to one input of the gate GG1 and to the negator NG1, while being extended to the other input of the gate GG1 and the negator NG2 over a shift register RG which is adapted to simultaneously store the signal elements respectively contained in one scanning column.

The operation of the smoothing device according to FIG. 10 will be explained with reference to FIG. 11. This figure shows, in a manner similar to FIG. 3, the scanning signals produced in a scanning column $n$ and in the preceding scanning column $n-1$ incident to the scanning of a symbol Z, of which only a part of its enveloping line is represented. The signal elements of these two scanning columns are simultaneously conducted to the two inputs of the And gate GG1 and to the two negators NG1 and NG2. At the instant $t1$, there will appear the "1" condition at the line *e* over which the scanning signal elements of the $n$th scanning column are fed to the smoothing device. However, there obtains at the same time the "0" condition at the output of the shift register RG which simultaneously releases the corresponding scanning signal elements of the $(n-1)$th column, so that the coincidence requirement is neither fulfilled for the GG1 nor for the GG2 gate. The coincidence condition will occur for the gate GG1 only at the instant $t2$, namely, when the condition "1" also obtains at the output of the shift register RG, thereby triggering the storer SG into the "1" condition. When the "0" condition appears again at the register output, at the instant $t3$, the coincidence condition is again absent for both of the And gates; the same applies also for the changes of condition taking place at the instants $t5$ and $t6$. Only when the "0" condition obtains, at the instant $t7$, on the line *e* as well as at the output of the register RG, will coincidence occur for the And gate GG2, at the two inputs of which there is then the condition "1" owing to the negators disposed ahead thereof, so that the storer SG will be triggered into the "0" condition. A signal course such as is represented along the bottom line of FIG. 11 will now appear at the output $f$ of the smoothing device shown in FIG. 10.

It may be mentioned in this connection that it may in some cases be advantageous to provide in serial relationship a plurality of smoothing devices such as shown in FIG. 10, so as to obtain symbols which are equalized to a far reaching extent.

The circuit arrangement described in the foregoing explanations and the method of operation on which it is based enable automatic identification of the Arabic numbers 1 . . . 0 solely with the aid of diverging and converging parts of line courses of a symbol to be identified and representing form elements therefor. The number or numeral 1 is identified since it alone contains no such form elements.

In accordance with a further feature of the invention, other form elements may be utilized for the automatic identification of symbols, so as to enable identification of numerals and/or characters even when written in more difficult script. As an example of such a further form element may be noted a straight line course or, briefly expressed, a stroke extending approximately in the direction of the scanning columns.

FIG. 12 illustrates a circuit arrangement for recognizing such a straight line course. This circuit arrangement comprises a counting register, the 0.7·1-register, the control input of which is connected with the output 11 of the comparison device shown in FIG. 6. To the output of the 0.7·1-register is connected one input of an And gate GS the other input of which is likewise connected with the output 11 of the comparison device. The And gate GS is connected with one input of each of two further And gates GS1 and GS$r$ which are in turn respectively connected with output storers SS1 and SS$r$. The second inputs of the respective gates GS1 and GS$r$ are connected each with an output of an intermediate storer SF which is controlled over a mixing gate GF from the two outputs D, K of the comparison device shown in FIG. 6. A restoring circuit extends from the output of the output storer SS$r$ and the mixing gate GF over an And gate G$r$ to a restoring input of the output storer SS$r$.

The 0.7·1-register is connected with a further register which is not shown in FIG. 12, namely, the length register L (FIG. 13) which determines in previously explained manner the height of a scanned symbol, the connection and cooperation being such that the last counting stage of the length register L which is activated by a counting operation corresponding to the numeral 1 of the counting steps, is caused to mark the counting stage of the 0.7·1-register which corresponds to a predetermined fraction of this number, for example, the 0.7th number 0.7·1 of the counting steps thereof. The 0.7·1-register is now rearwardly stepped, from this marked counting stage, always one step, when the comparison device shown in FIG. 6 ascertains the appearance of a scanning signal element pair "11" containing two signal elements "1" corresponding to the appearance of an element of a line course. When the 0.7·1-register is stepped back to the first counting stage, by such signal element pairs of two mutually compared scanning columns, its output will be activated and coincidence will be effected for the And gate GS responsive to the next activation of the output 11 of the comparison device explained with reference to FIG. 6, thereby indicating the presence of a form element in the shape of a straight line course or stroke extending approximately in the direction of the scanning column. However, if a signal element pair "00" appears which may indicate the lower border of the scanned symbol, before the 0.7·1-register reaches the first counting stage, such register will be immediately stepped into its initial position over the activated output 00 of the comparison device. Accordingly, the presence of a stroke will be indicated only when it extends over at least 0.7th of the height of a scanned symbol. It may however be mentioned in this connection that the indication of a stroke or straight line can of course be made dependent upon attaining another fraction of the height of a scanned symbol.

In order to give an example for the determination of the position of a stroke extending in a direction perpendicular to the scanning columns, it will now be shown with reference to FIG. 12 how the appearance of a stroke can be ascertained which extends at the right or the left margin of a symbol which is being scanned. It is in corresponding manner possible to ascertain also a stroke appearing centrally of a symbol.

In FIG. 12, the output of the And gate GS is connected with one input of each of two further And gates GS1 and GS$r$. The other inputs of these gates are respectively connected with the outputs $l$, $r$ of a 1-bit intermediate storer SF which is controlled over a mixing gate GF from the two outputs D and K of the comparison device represented in FIG. 6. Depending upon whether or not the comparison device has in the course of the scanning of a symbol ascertained a form element, there will obtain the "1" condition at the output $r$ or at the output $l$ of the storer SF. Corresponding to this situation, incident to the indication by the And gate GS, of a straight line representing a form element, there will appear the coincidence condition either at the And gate GS$r$ or at the And gate GS1. In case no other form element had been ascertained prior to the recognition of the straight line, the coincidence requirement for the And gate GS1 will be fulfilled and the output storer SS1 which is connected thereto will be activated, thereby indicating the presence of a straight line course (stroke, left) appearing before any other form element. The output storer SS$r$ will be analogously activated in case other form elements have been ascertained before and also in case no further form elements should appear. To satisfy the last noted requirement, the output of the output storer SS$r$ as well as the output of the mixing gate GF is over the And gate G$r$ connected with the restoring input of the output storer SS$r$ over which the storer is, upon ascertaining a form element by the comparison device shown in FIG. 6, immediately restored to normal. It will be seen, therefore, that it is possible to ascertain, with the aid of the arrangement according to FIG. 12, the appearance of a form element represented by a straight line course of a given relative length as well as the position of such form element within a scanned symbol.

FIG. 13 presents in the form of a block circuit diagram an overall view of the circuit arrangement for the automatic identification of symbols, which has been described in detail in the course of the foregoing explanations.

In FIG. 13, A indicates a suitable light-electric device for the column-wise scanning of symbols to be identified. This scanning device is directly connected with a synchronizing device such as described with reference to FIG. 4, which is controlled by a central timing generator ZTG, such generator also controlling the operations of all remaining devices. The interconnections between the timing generator ZTG and most of the devices controlled thereby have been omitted to keep the drawing simple. The scanning signal elements produced are stored in a storing device S which is separately illustrated in FIG. 9, and are extended therefrom to a smoothing device G details of which are shown in FIG. 10. The signal elements are extended from the smoothing device G directly to an input $n$ of a comparison device V, such as described with reference to FIG. 6, and also over a shift register R (which is adapted to store the signal elements of a scanning column) to the other input $n$—1 of the storing device V. The comparison device ascertains by stepwise comparison of mutually corresponding scanning signal elements of a column, which indicate respectively the presence or the absence of an element of a line course, and of the signal elements of a preceding column, the appearance of diverging and/or converging parts of a line course, representing form elements of a symbol to be identified. The comparison device V is connected with a form element storer F, such as described for example with reference to FIG. 8, which is with respect to the kind of recognized form element (divergence, convergence) controlled by the comparison device V. A form element counter Z (explained with reference to FIG. 7) transmits to the form element storer F information as to the relative position of the individual form elements within the symbol which is being scanned. The form element counter Z is for this purpose connected with the comparison device V and with a length register L which is operatively controlled by the storage device S (shown in detail in FIG. 9) and ascertains the height of the symbol which is being scanned. The operative control of this and also the remaining registers is effected by a common register control device RS. The length register L contributes also to the control of the device shown in FIG. 12 which serves for the recognition of a further form element represented by a straight line (stroke) and which is likewise connected with the comparison device V. To the outputs of the form element storer F and the stroke recognition device E are connected a plurality of And gates, each of which is assigned to a symbol to be identified, the cooperation with such gates being such that, upon activation of the outputs of the form element storer F which corresponds to the form elements of predetermined form element symbols and activation of the stroke ascertaining device E, coincidence condition will be effected with respect to the And gate assigned to the respectively involved symbol, thereby effecting identification of the respective symbol. To give an example, this is brought out in FIG. 13 in simplified form with regard to the recognition of the numeral 9.

Changes may be made within the scope and spirit of the appended claims which define what is believed to be new and desired to have protected by Letters Patent.

We claim:

1. An arrangement for automatically recognizing written symbols, comprising means for effecting, along a desired coordinate direction, line by line scanning of a symbol which is to be recognized, so as to produce binary scanning signal elements which respectively indicate the presence or absence of an element of a line course of the corresponding symbol, means connected with said scanning means for carrying out a comparison between said scanning signal elements and corresponding scanning signal elements obtained in the course of scanning a preceding line extending in such desired coordinate direction, the correspondence between the compared scanning signal elements residing thereby in that the respective scanned area elements have in the corresponding coordinate direction the identical coordinate, means connected with said comparison means for effecting a further comparison of successive pairs of such mutually corresponding scanning signal elements, the correspondence between compared scanning signal element pairs residing thereby in that respective pairs of area elements have the identical coordinate perpendicularly to said coordinate direction, thereby ascertaining the appearance of divergence or convergence of parts of a line course representing a form element of the symbol to be recognized, means connected with said further comparison means for storing the ascertained form elements corresponding to the relative position thereof, and further means connected with said storing means for effecting a comparison of the ascertained and stored form elements with predetermined form element symbols from which the respective written symbol is obtained.

2. An arrangement for automatically recognizing written symbols, comprising means for effecting, along a desired coordinate direction, line by line scanning of a symbol which is to be recognized, so as to produce binary scanning signal elements ("1" and "0") which indicate respectively the presence or absence of an element of a line course of the scanned symbol, circuit means connected with said scanning means for carrying out a comparison between mutually corresponding binary scanning signal elements of a line extending in a desired coordinate direction and of a preceding line extending in such coordinate direction, the correspondence between the compared scanning signal elements thereby residing in that the respective scanned area elements have in the corresponding coordinate direction the identical coordinate, means connected with said comparison means for effecting a further comparison of successive pairs of such mutually corresponding scanning signal elements, the correspondence between compared scanning signal element pairs thereby residing in that the respective pairs of area elements have the identical coordinate perpendicularly to said coordinate direction, thereby ascertaining the appearance of at least one signal element pair ("10" or "01") which has only one scanning signal element ("1") corresponding to the coincidence with an element of a line course, and which is ascertained directly between signal element pairs ("11") consisting respectively of two signal elements ("1") corresponding to the coincidence with an element of a line course, thereby recognizing the appearance of divergence or convergence of parts of a line course representing respectively a form element of the symbol to be recognized, means connected with said comparison means for storing the recognized form elements according to the relative position thereof, and further means connected to said storing means for carrying out a comparison between said recognized and stored for elements and predetermined form element symbols from which the respective symbol is obtained.

3. An arrangement according to claim 2, comprising a first And gate and two blocking gates, means for stepwise simultaneously conducting to the inputs of said gates the scanning signal elements denoting respectively the presence and absence of symbol elements of a scanned line and a preceding scanned line, an intermediate storer, two further And gates, means for connecting said first named And gate over said intermediate storer to first inputs of two second And gates, means for connecting the second inputs of said second And gates with the outputs of the two second And gates, each of said second And gates being connected over an intermediate storer with an input of two third And gates the other inputs of which are respectively connected with the output of the first And gate, each of said third And gates being connected with an output storer, the activation of said output storer indicating respectively the presence of divergence or convergence of symbol parts of a scanned line course.

4. An arrangement according to claim 3, comprising a shift register, means for conducting said scanning signals respectively directly to one input of said comparison circuit arrangement and to an input of said shift register, means for connecting the output of said shift register to the other input of said comparison circuit arrangement, said shift register having a storage capacity which permits simultaneous storage of scanning signal elements contained in a scanning line.

5. An arrangement according to claim 4, comprising a symbol smoothing stage, means for disposing the output storer of said symbol smoothing stage ahead of said shift register and said comparison circuit arrangement, a first and a second negator, a shift register, means for extending the scanning signal elements of each scanning line directly to one input of the first And gate of two And gates disposed ahead of the two inputs of the output storer and to the first negator which is disposed ahead of one input of the second And gate, while extending such scanning signal elements over said shift register to the other input of the first And gate as well as to the second negator disposed ahead of the other input of the second And gate, said shift register having a storage capacity which permits simultaneous storage of the scanning signal elements contained in a scanning line.

6. An arrangement according to claim 5, comprising a plurality of serially connected symbol smoothing stages.

7. An arrangement according to claim 2, comprising a storing device connected to said scanning device, said storing device having a plurality of storing means corresponding in number to the number of scanning lines required for the scanning of a symbol, said storing means effecting the release of successively stored scanning signal elements in the manner of a shift register and in the sequence in which said signals are stored, the capacity of the respective storing means permitting simultaneous storing of the signal elements contained in the respective scanning lines, a timing generator for controlling the operation of said storing means in parallel circuit, the output of the respective storing means being connected with the input of the respectively next successive storing means.

8. An arrangement according to claim 7, comprising means for effecting storage of said scanning signal elements of the individual scanning lines, produced by said scanning device, serially successively over the input of the first storage means into the storing means of the storage device, and means for successively releasing, incident to a cycle of operation of the timing generator, the signal elements of a scanning line at the output of the last storage means, while simultaneously releasing at the outputs of said storing means signal elements which extend perpendicular to the scanning lines.

9. An arrangement according to claim 3, comprising a form element storer and a form element counter connected with said comparison circuit, means governed by said comparison circuit for controlling said form element storer in accordance with the kind of form elements recognized as to divergence and convergence thereof and for controlling the operation of said form element counter, respectively, and means governed by said form element counter for controlling said form element storer in accordance with the sequence of appearance of said form elements within the scanned symbol.

10. An arrangement according to claim 9, wherein said form element storer comprises a plurality of output storers each of which is assigned to a particular kind of form element diverging or converging, and to the seqence of a form element, the respective output storers being activated only responsive to the scanning of the form element respectively assigned thereto.

11. An arrangement according to claim 9, wherein said form element counter comprises at least one multistage counting chain, and a mixing gate for connecting the input of said counting chain with the output storer which indicates by its activation the divergence or convergence of parts of a scanned line course.

12. An arrangement according to claim 11, comprising an And gate disposed ahead of each output storer of said form element storer, one predetermined input of said And gate being controlled by the output storer which indicates by its activation the divergence or convergence of a scanned line course, the other predetermined input of said And gate being connected with one of the stages of the counting chain, whereby one of the output storers is respectively activated upon appearance of a form element depending respectively upon divergence or convergence and the sequence of appearance thereof.

13. An arrangement according to claim 12, wherein said form element counter comprises a count register, controlled by a length register, for determining the relative position of each scanning signal element within the respective scanning line.

14. An arrangement according to claim 13, comprising means for interconnecting said length register and said count register of the form element counter so as to cause the last counting stage of the length register, which has been activated by a counting operation corresponding to the number of counting steps, to mark the counting stage of the count register of the form element counter, which corresponds to a fraction of this number and particularly to half of the number of counting steps.

15. An arrangement according to claim 14, wherein said length register is controlled by a storing device disposed ahead of the comparison circuit, in which the linewise scanned symbol is initially stored, such that a counting operation is triggered incident to the scanning of a line course involving a blank line which delimits the upper border of the scanned symbol and that the counting operation is concluded upon reaching the blank line delimiting the lower border of the symbol which is being scanned after completing the counting of the scanning signal elements lying between said blank lines.

16. An arrangement according to claim 15, wherein the count register of the form element counter is, conjointly with each comparison of the scanning signal element of one line and a preceding line, operated rearwardly from the marked counting stage to the first counting stage, to effect activation of an output storer connected to said first counting stage so as to trigger said output storer from one to the other operating condition thereof, said operating conditions denoting respectively the upper and the lower portions of the symbol which is being scanned.

17. An arrangement according to claim 16, wherein said form element counter comprises two counting chains each with an And gate disposed ahead thereof, one input of the respective And gates being connected over a mixing gate with the output storers which indicate by the activation thereof respectively the appearance of divergence and convergence of a scanned line course, the other input of said And gates being respectively connected with an output of the output storer assigned to the relative position of the scanning signal element in the upper or lower part of the symbol which is being scanned.

18. An arrangement according to claim 17, wherein the form element storer comprises a plurality of intermediate storing means the respective outputs of which are connected each with a predetermined input of And gates disposed ahead of the output storers to which are respectively assigned the same predetermined kind, divergence or convergence, and relative position of form elements, one input of and And gate being connected with one or the other output storer which indicates by its activation the presence of divergence or convergence of parts of a line course, the other input of said And gate being connected with one of the outputs of the output storer which is assigned to the relative position of the scanning signal element, whereby one of said intermediate storers is activated upon appearance of a form element depending upon divergence or convergence and relative position thereof.

19. An arrangement according to claim 18, comprising a plurality of And gates which are respectively assigned each to one symbol to be identified, and means for connecting said And gates to the respective outputs of the form element storer, whereby coincidence is established with respect to an And gate assigned to a given symbol upon activation of the outputs of the form element storer which are allotted to the form elements of said symbol for the purpose of identifying such symbol.

20. An arrangement according to claim 3, comprising means for connecting to the first And gate the input of a count register and one input of an And gate the other input of which is connected with the output of said count register, whereby coincidence is established with respect to said And gate upon appearance of a sequence of signal element pairs consisting respectively of two signal elements which correspond to the appearance of elements of a line course, thus recognizing the appearance of a form element representing a line course extending in the form of a stroke approximately in the direction of the scanning lines.

21. An arrangement according to claim 20, comprising a line stroke symbol recognizing device, a length register and a count register, and means for interconnecting said register so as to cause the last counting stage of the length register, which is activated by a counting operation and corresponds to the number of counting steps, to mark a counting stage of the count register which corresponds to a predetermined fraction of the number of said counting steps.

22. An arrangement according to claim 21, wherein said signal element pairs are operative to drive said count register of the line stroke recognizing device from the marked counting stage rearwardly in the direction of the first counting stage thereof, the output of said count register being activated when said count register reaches said first counting stage, and means controlled by the signal element pair denoting the borders of the symbol being scanned for restoring said count register to normal position.

23. An arrangement according to claim 22, comprising means for connecting the output of the And gate of the line stroke recognizing device with one input of two further And gates, the other input of the respective further And gates being respectively connected with an output of an intermediate storer, means for connecting the input of said intermediate storer over a mixing gate with the two outputs of the comparison device, said further And gates being connected with an output storer, one of said output storers having a restoring input which is connected with the output thereof and with said mixing gate, the activation of said further And gates indicating respectively the appearance of a left stroke ahead of any other form element and of a right stroke back of some other form element.

24. An arrangement according to claim 23, comprising means for connecting to the outputs of the form element storer and those of the stroke recognizing device a plurality of And gates each of which is assigned to a symbol which is to be identified, whereby the activation of those of the outputs which are assigned to the form elements of a given form element symbol effects coincidence for the And gate assigned to such symbol for the purpose of identifying the corresponding symbol.

References Cited

UNITED STATES PATENTS

| | | | |
|---|---|---|---|
| 2,897,481 | 7/1959 | Shephard. | |
| 2,959,769 | 11/1960 | Greanias. | |
| 3,008,123 | 11/1961 | Rohland. | |
| 3,011,152 | 11/1961 | Eckdahl. | |
| 3,065,457 | 11/1962 | Bailey. | |
| 3,088,096 | 4/1963 | Steinbuch. | |
| 3,102,995 | 9/1963 | Abbott. | |
| 3,136,976 | 6/1964 | Dietrich. | |
| 3,185,962 | 5/1965 | Ingham. | |
| 2,877,951 | 3/1959 | Rohland | 340—149.1 |
| 2,889,535 | 7/1959 | Rochester et al. | 340—149.1 |
| 2,928,074 | 3/1960 | Sutter | 340—149.1 |
| 2,932,006 | 4/1960 | Glauberman | 340—149.1 |

MAYNARD R. WILBUR, *Primary Examiner.*

J. SHERIDAN, *Assistant Examiner.*